US012651400B2

(12) United States Patent
Gu et al.

(10) Patent No.: US 12,651,400 B2
(45) Date of Patent: Jun. 9, 2026

(54) PERFORMING TEXEL ACCESS OPERATIONS ON MULTIPLE TEXELS RESPONSIVE TO EXECUTING A SINGLE INSTRUCTION BY GRAPHICS PROCESSING UNITS (GPUs)

(71) Applicant: QUALCOMM Incorporated, San Diego, CA (US)

(72) Inventors: Sheng Gu, San Diego, CA (US); Qin Chen, San Diego, CA (US); Mengbo Zhou, San Diego, CA (US); Gang Zhong, San Diego, CA (US); Yun Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 147 days.

(21) Appl. No.: 18/606,558

(22) Filed: Mar. 15, 2024

(65) Prior Publication Data

US 2025/0292482 A1 Sep. 18, 2025

(51) Int. Cl.
G06T 15/04 (2011.01)
G06T 1/20 (2006.01)

(52) U.S. Cl.
CPC ............... G06T 15/04 (2013.01); G06T 1/20 (2013.01)

(58) Field of Classification Search
CPC ..... G06T 15/04; G06T 11/001; G06T 15/005; G06T 7/40; G06T 7/49; G06T 7/529; G06T 11/40; G06T 17/00; G06T 1/20
See application file for complete search history.

(56) References Cited

U.S. PATENT DOCUMENTS 6,362,824 B1 * 3/2002 Thayer .................... G06T 15/04
345/503
2018/0357804 A1 * 12/2018 Forutanpour ........... G06T 11/60

OTHER PUBLICATIONS

Khronos Group, "imageLoad—load a single texel from an image," 2011-2014, retrieved May 2024 from the Internet: [URL: https://registry.khronos.org/OpenGL-Refpages/gl4/html/imageLoad.xhtml], 2 pages.
Khronos Group, "itexelFetch—perform a lookup of a single texel within a texture," 2011-2014, retrieved May 2024 from the Internet: [URL: https://registry.khronos.org/OpenGL-Refpages/gl4/html/texelFetch.xhtml], 3 pages.

* cited by examiner

*Primary Examiner* — Hau H Nguyen
(74) *Attorney, Agent, or Firm* — W&T

(57) ABSTRACT

Performing texel access operations on multiple texels responsive to executing a single instruction by graphics processing units (GPUs) is disclosed herein. In some aspects, a GPU is configured to, responsive to execution of a single instruction, determine a first coordinate and a second coordinate of a location of a first texel of a texture. The GPU is further configured to determine a first offset corresponding to the first coordinate of the first texel and a second offset corresponding to the second coordinate of the first texel. The GPU is also configured to perform a texel access operation on each of the first texel and a second texel of the texture, wherein a location of the second texel is represented by a first sum of the first coordinate and the first offset, and a second sum of the second coordinate and the second offset.

29 Claims, 9 Drawing Sheets

PERFORMING TEXEL ACCESS OPERATIONS ON MULTIPLE TEXELS RESPONSIVE TO EXECUTING A SINGLE INSTRUCTION BY GRAPHICS PROCESSING UNITS (GPUs)

TECHNICAL FIELD

The technology of the disclosure relates generally to graphics processing units (GPUs) in processor-based devices, and, in particular, to optimizing texel access operations by GPUs.

BACKGROUND

Modern processor-based devices include a dedicated processing unit known as a graphics processing unit (GPU) to accelerate the generation and rendering of graphics and video data for display. A GPU may be implemented as an integrated element of a general-purpose central processing unit (CPU) of a processor-based device, or as a discrete hardware element that is separate from the CPU. To better create realistic three-dimensional (3D) computer-generated images, a GPU may be configured to perform a process known as "texture mapping" to apply a texture image to a 3D surface to create the illusion of surface detail. Texture mapping involves the GPU mapping "texels," which are the fundamental units of the texture, to corresponding pixels that make up the 3D surface. The GPU can further use texture filtering to manipulate the color, transparency, reflectivity, and size of the texels to achieve different visual effects.

As the demand for increased realism in 3D applications increases, the amount of texture processing and postprocessing that the GPU is required to perform likewise increases. Such processing and postprocessing includes operations for fetching multiple horizontal and/or vertical samples from textures, as well as texture filtering operations. In performing such processing, the GPU conventionally requires multiple texel access operations (e.g., to read texel data from a texture). This may result in inefficiencies when, for example, a large number of texel access operations are performed.

SUMMARY OF THE DISCLOSURE

Aspects disclosed in the detailed description include performing texel access operations on multiple texels responsive to executing a single instruction by graphics processing units (GPUs). Related apparatus, methods, and computer-readable media are also disclosed. In this regard, a GPU is configured to execute an instruction that takes as input a base set of coordinates for a texel and an offset for one or more of the coordinates of the texel, and uses the base set of coordinates and the offset to access multiple texels in a texture. In exemplary operation, the GPU, in response to execution of a single instruction (e.g., a new load instruction or a new store instruction provided by an instruction set architecture (ISA) of the GPU, as non-limiting examples), determines a first coordinate and a second coordinate of a location of a first texel of a texture. The GPU also determines a first offset corresponding to the first coordinate and a second offset corresponding to the second coordinate. For example, the first coordinate and the second coordinate may comprise an X coordinate and a Y coordinate, respectively, of the first texel within the texture, while the first offset and the second offset may comprise an X offset and a Y offset, respectively. The GPU then performs a texel access operation (e.g., a load operation or a store operation, as non-limiting examples) on each of the first texel and a second texel of the texture, where a location of the second texel is represented by a first sum of the first coordinate and the first offset, and a second sum of the second coordinate and the second offset.

In some aspects in which the single instruction comprises a load instruction, the GPU may perform the texel access operation by reading texel data corresponding to the first texel from the location of the first texel, and storing the texel data corresponding to the first texel in a corresponding first plurality of general purpose registers (GPRs). The GPU also reads texel data corresponding to the second texel from the location of the second texel, and stores the texel data corresponding to the second texel in a corresponding second plurality of GPRs. Some such aspects may provide that the GPU also performs a texture filtering operation on the texel data corresponding to the first texel and the texel data corresponding to the second texel. According to some aspects, after reading the texel data corresponding to the first texel and the texel data corresponding to the second texel, the GPU may perform a merge operation (e.g., a sum operation or an exclusive-OR (XOR) operation, as non-limiting examples) using the texel data corresponding to the first texel and the texel data corresponding to the second texel. The GPU then stores merged texel data in a corresponding plurality of GPRs.

Aspects in which the single instruction comprises the store instruction may provide that the GPU performs the texel access operation by reading texel data corresponding to the first texel from a corresponding first plurality of GPRs, and storing the texel data corresponding to the first texel at the location of the first texel. The GPU also reads texel data corresponding to the second texel from a corresponding second plurality of GPRs, and stores the texel data corresponding to the second texel at the location of the second texel.

In some aspects, the first offset and the second offset may comprise an offset pair of a plurality of offset pairs that each corresponds to a texel subsequent to the first texel among a plurality of texels that includes the first texel and the second texel. Such aspects may provide that the GPU performs the texel access operation on the plurality of texels comprising the first texel and the second texel, wherein a location of each texel subsequent to the first texel among the plurality of texels is represented by a sum of the first coordinate and a first offset of an offset pair corresponding to the texel and a sum of the second coordinate and a second offset of the offset pair corresponding to the texel.

In another aspect, a GPU is disclosed. The GPU is configured to, responsive to execution of a single instruction, determine a first coordinate and a second coordinate of a location of a first texel of a texture. The GPU is further configured to determine a first offset corresponding to the first coordinate of the first texel and a second offset corresponding to the second coordinate of the first texel. The GPU is also configured to perform a texel access operation on each of the first texel and a second texel of the texture, wherein a location of the second texel is represented by a first sum of the first coordinate and the first offset, and a second sum of the second coordinate and the second offset.

In another aspect, a GPU is disclosed. The GPU comprises means for, responsive to execution of a single instruction, determining a first coordinate and a second coordinate of a location of a first texel of a texture. The GPU further comprises means for determining a first offset corresponding to the first coordinate of the first texel and a second offset corresponding to the second coordinate of the first texel. The GPU also comprises means for performing a texel access operation on each of the first texel and a second texel of the texture, wherein a location of the second texel is represented by a first sum of the first coordinate and the first offset, and a second sum of the second coordinate and the second offset.

In another aspect, a method for performing texel access operations on multiple texels responsive to executing a single instruction by GPUs is disclosed. The method comprises determining, in response to execution of a single instruction by a GPU, a first coordinate and a second coordinate of a location of a first texel of a texture. The method further comprises determining a first offset corresponding to the first coordinate of the first texel and a second offset corresponding to the second coordinate of the first texel. The method also comprises performing a texel access operation on each of the first texel and a second texel of the texture, wherein a location of the second texel is represented by a first sum of the first coordinate and the first offset, and a second sum of the second coordinate and the second offset.

In another aspect, a non-transitory computer-readable medium is disclosed. The non-transitory computer-readable medium stores computer-executable instructions that, when executed by a GPU, cause the GPU to, responsive to execution of a single instruction, determine a first coordinate and a second coordinate of a location of a first texel of a texture. The computer-executable instructions further cause the GPU to determine a first offset corresponding to the first coordinate of the first texel and a second offset corresponding to the second coordinate of the first texel. The computer-executable instructions also cause the GPU to perform a texel access operation on each of the first texel and a second texel of the texture, wherein a location of the second texel is represented by a first sum of the first coordinate and the first offset, and a second sum of the second coordinate and the second offset.

DETAILED DESCRIPTION

Figure 1:
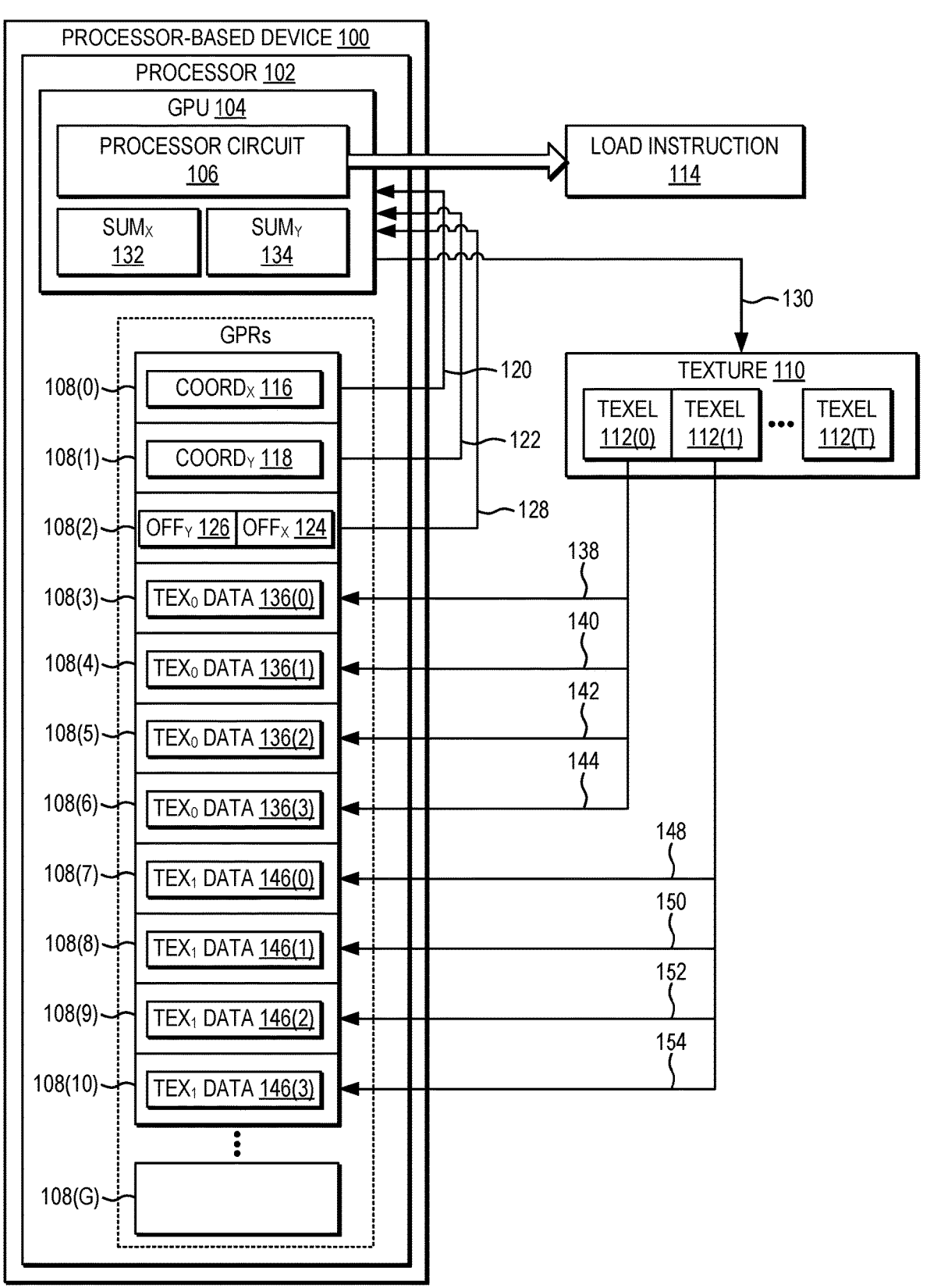
FIG. 1 is a block diagram of an exemplary processor-based system that includes a processor-based device with a graphics processing unit (GPU) configured to perform texel access operations on multiple texels responsive to executing a single load instruction, according to some aspects.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects. The terms "first," "second," and the like are used herein to distinguish between similarly named elements, and are not to be interpreted as indicating an ordinal relationship between such elements unless expressly described as such herein.

Aspects disclosed in the detailed description include performing texel access operations on multiple texels responsive to executing a single instruction by graphics processing units (GPUs). Related apparatus, methods, and computer-readable media are also disclosed. In this regard, a GPU is configured to execute an instruction that takes as input a base set of coordinates for a texel and an offset for one or more of the coordinates of the texel, and uses the base set of coordinates and the offset to access multiple texels in a texture. In exemplary operation, the GPU, in response to execution of a single instruction (e.g., a new load instruction or a new store instruction provided by an instruction set architecture (ISA) of the GPU, as non-limiting examples), determines a first coordinate and a second coordinate of a location of a first texel of a texture. The GPU also determines a first offset corresponding to the first coordinate and a second offset corresponding to the second coordinate. For example, the first coordinate and the second coordinate may comprise an X coordinate and a Y coordinate, respectively, of the first texel within the texture, while the first offset and the second offset may comprise an X offset and a Y offset, respectively. The GPU then performs a texel access operation (e.g., a load operation or a store operation, as non-limiting examples) on each of the first texel and a second texel of the texture, where a location of the second texel is represented by a first sum of the first coordinate and the first offset, and a second sum of the second coordinate and the second offset.

In some aspects in which the single instruction comprises a load instruction, the GPU may perform the texel access operation by reading texel data corresponding to the first texel from the location of the first texel, and storing the texel data corresponding to the first texel in a corresponding first plurality of general purpose registers (GPRs). The GPU also reads texel data corresponding to the second texel from the location of the second texel, and stores the texel data corresponding to the second texel in a corresponding second plurality of GPRs. Some such aspects may provide that the GPU also performs a texture filtering operation on the texel data corresponding to the first texel and the texel data corresponding to the second texel. According to some aspects, after reading the texel data corresponding to the first texel and the texel data corresponding to the second texel, the GPU may perform a merge operation (e.g., a sum operation or an exclusive-OR (XOR) operation, as non-limiting examples) using the texel data corresponding to the first texel and the texel data corresponding to the second texel. The GPU then stores merged texel data in a corresponding plurality of GPRs.

Aspects in which the single instruction comprises the store instruction may provide that the GPU performs the texel access operation by reading texel data corresponding to the first texel from a corresponding first plurality of GPRs, and storing the texel data corresponding to the first texel at the location of the first texel. The GPU also reads texel data corresponding to the second texel from a corresponding second plurality of GPRs, and stores the texel data corresponding to the second texel at the location of the second texel.

In some aspects, the first offset and the second offset may comprise an offset pair of a plurality of offset pairs that each corresponds to a texel subsequent to the first texel among a plurality of texels that includes the first texel and the second texel. Such aspects may provide that the GPU performs the texel access operation on the plurality of texels comprising the first texel and the second texel, wherein a location of each texel subsequent to the first texel among the plurality of texels is represented by a sum of the first coordinate and a first offset of an offset pair corresponding to the texel and a sum of the second coordinate and a second offset of the offset pair corresponding to the texel.

In this regard, FIG. 1 is a block diagram of an exemplary processor-based device 100. The processor-based device 100 comprises a processor 102 (also referred to a "processor core" or a "CPU core"), which may be an in-order or an out-of-order processor (OoP), and/or may be one of a plurality of processors 102 provided by the processor-based device 100. Examples of the processor 102 may include, but are not limited to, a digital signal processor (DSP), general-purpose microprocessor, application specific integrated circuit (ASIC), field programmable logic array (FPGA), or other equivalent integrated or discrete logic circuitry.

As seen in FIG. 1, the processor 102 comprises a graphics processing unit (GPU) 104, which provides a processor circuit 106 for executing instructions for performing graphical operations. As a non-limiting example, the GPU 104 may comprise a dedicated hardware unit having fixed functionality and programmable components for rendering graphics and executing GPU applications. The GPU 104 may also include a DSP, general-purpose microprocessor, ASIC, FPGA, or other equivalent integrated or discrete logic circuitry, which are not shown in FIG. 1 for the sake of clarity. Note that, while the processor 102 and GPU 104 are illustrated as a single unit in the example of FIG. 1, in some examples, the processor 102 and GPU 104 may be implemented as separate hardware elements. Although not shown in FIG. 1, it is to be understood that the processor 102 of FIG. 1 may execute a software application or provide an application programming interface (API) that submits, to the processor 102, graphics instructions from which a graphics workload may be determined for processing by the GPU 104. The processor 102 also comprises a plurality of general purpose registers (captioned as "GPRs" in FIG. 1) 108(0)-108(G) that may be used to store the results of memory access operations, arithmetic computations, and/or the like.

The processor-based device 100 of FIG. 1 may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages. It is to be understood that some aspects of the processor-based device 100 may include elements in addition to those illustrated in FIG. 1, and/or may include more or fewer of the elements illustrated in FIG. 1. For example, the processor-based device 100 may further include additional processors 102, processor cores, caches, controllers, communications buses, and/or persistent storage devices, which are omitted from FIG. 1 for the sake of clarity.

To generate realistic three-dimensional (3D) computer-images, the GPU 104 is configured to perform texture mapping to apply a texture 110 to a 3D surface (not shown) to create the illusion of surface detail. The texture 110 of FIG. 1 comprises a plurality of texels 112(0)-112(T), each of which represents a smallest addressable unit of the texture 110 and which may be mapped to one or more screen pixels of the 3D surface. The texels 112(0)-112(T) each comprise texel data, and are associated with a set of coordinates that represents a location within the texture 110.

As noted above, conventional image processing and post-processing may require the fetching of multiple ones of the texels 112(0)-112(T) from the texture 110. For example, a graphics application being executed by the GPU 104 may include the following high-level pseudocode shown in Table 1:

TABLE 1

```
uvec4 texel0 = imageLoad(g_workingEdges, ivec2(x, y_center – 1));
uvec4 texel1 = imageLoad(g_workingEdges, ivec2(x, y_center + 2));
```

The code shown in Table 1 retrieves data for two texels (texel0 and texel1) from a texture (g_workingEdges), where texel0 is located at coordinates x, y_center−1 and texel1 is located at coordinates x, y_center+2. A conventional compiler may compile the above code into the two (2) load ("ld") instructions shown below in Table 2:

TABLE 2

```
ld r0[4], r12[2], u0   // the texture coordinates are read from two (2) GPRs r12 and r13;
read texel data is stored in four (4) GPRs r0-r3.
ld r4[4], r14[2], u0   // the texture coordinates are read from two (2) GPRs r14 and r15;
read texel data is stored in four (4) GPRs r4-r7
```

However, the need for two (2) separate load instructions to access texels may result in processing inefficiencies. For example, if the texel data for texel0 and texel1 in the above example are located within a same cache line that can be accessed with one instruction, the GPU 104 would still need to execute the two (2) load operations shown above to access the texel data.

Accordingly, in this regard, the GPU 104 is configured to perform texel access operations on multiple texels responsive to executing a single instruction. In the example of FIG. 1, the processor circuit 106 of the GPU 104 executes a load instruction 114 that is provided by an ISA of the GPU 104. The execution of the load instruction 114 causes the GPU 104 to perform a series of operations. The GPU 104 determines a first coordinate (captioned as "COORD$_X$" in FIG. 1) 116 and a second coordinate (captioned as "COORD$_Y$" in FIG. 1) 118 of a location of a texel such as the texel 112(0) of the texture 110. In FIG. 1, the GPU 104 determines the first coordinate 116 and the second coordinate 118 by reading each from corresponding GPRs 108(0) and 108(1), as indicated by arrows 120 and 122. The first coordinate 116 in the example of FIG. 1 represents an X coordinate of the texel 112(0), while the second coordinate 118 represents a Y coordinate of the texel 112(0).

The GPU 104 also determines a first offset (captioned as "OFF$_X$" in FIG. 1) 124 corresponding to the first coordinate 116 of the first texel 112(0) and a second offset (captioned as "OFF$_Y$" in FIG. 1) 126 corresponding to the second coordinate 118 of the first texel 112(0) (e.g., by reading the first offset 124 and the second offset 126 from the GPR 108(2), as indicated by arrow 128). The first offset 124 in FIG. 1 represents an X coordinate offset, while the second offset 126 represents a Y coordinate offset. The GPU 104 then performs a texel access operation on the texel 112(0) and another texel such as the texel 112(1) of the texture 110, as indicated by arrow 130. A location of the texel 112(1) is represented by a first sum (captioned as "SUM$_X$" in FIG. 1) 132 of the first coordinate 116 and the first offset 124, and a second sum (captioned as "SUM$_Y$" in FIG. 1) 134 of the second coordinate 118 and the second offset 126.

In the example of FIG. 1, the texel access operation performed by the GPU 104 is a load operation corresponding to the load instruction 114. Accordingly, the GPU 104 reads texel data (captioned as "TEX$_0$ DATA" in FIG. 1) 136(0)-136(3) corresponding to the texel 112(0) from the location of the texel 112(0), and stores the texel data 136(0)-136(3) corresponding to the texel 112(0) in a corresponding plurality of GPRs 108(3)-108(6) as indicated by arrows 138, 140, 142, and 144. The GPU 104 also reads texel data (captioned as "TEX$_1$ DATA" in FIG. 1) 146(0)-146(3) corresponding to the texel 112(1) from the location of the texel 112(1), and stores the texel data 146(0)-146(3) corresponding to the texel 112(1) in a corresponding plurality of GPRs 108(7)-108(10) as indicated by arrows 148, 150, 152, and 154. The texel data 136(0)-136(3) and the texel data 146(0)-146(3) may be generally referred to herein as "texel data 136" and "texel data 146," respectively.

The load instruction 114 in some aspects may be implemented as an "ldxn" instruction by the ISA of the GPU 104. Aspects according to FIG. 1 thus may execute the following pseudocode shown in Table 3 to accomplish the same result as the multiple ld instructions shown above in Table 2:

TABLE 3

```
r14 = 3<<16    // offset; since ΔX = 0 and ΔY = 3, the lower 16 bits store offset
of zero (0) for x, while higher 16 bits stores offset of three (3) for Y
ldxn r0[8], r12[3], u0   // the texture coordinates and offsets are read from three (3)
GPRs r12-r14; read texel data is stored in eight (8) GPRs r0-r7
```

In some aspects, the GPU 104 may perform further operations, in addition to a texel access operation, in response to executing a single instruction such as the load instruction 114. For example, some such aspects may provide that the GPU 104 is configured to perform texture filtering operations on the texel data 136(0)-136(3) corresponding to the texel 112(0) and the texel data 146(0)-146(3) corresponding to the texel 112(1).

Figure 2:
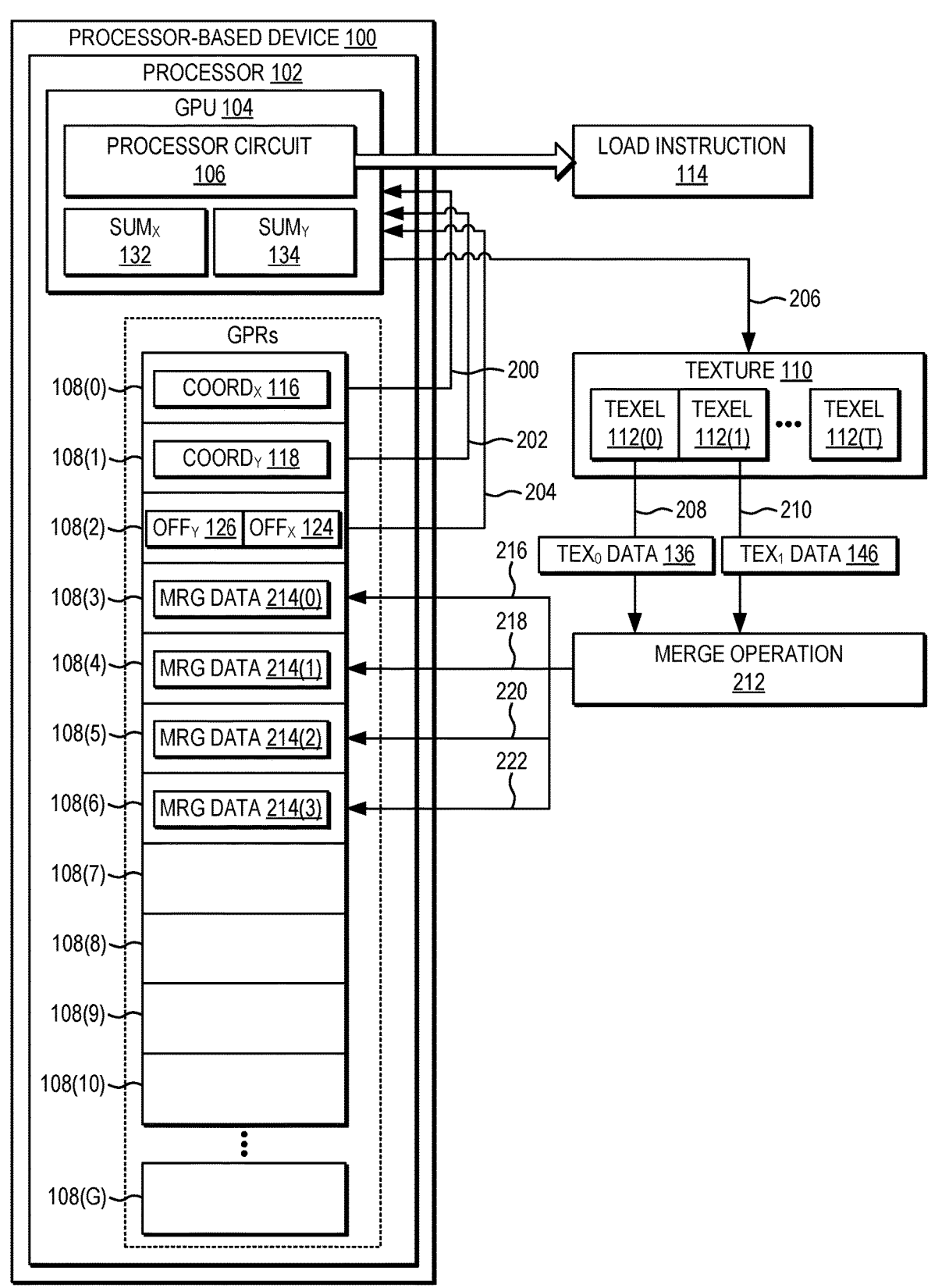
FIG. 2 is a block diagram of the exemplary processor-based system of FIG. 1 wherein the GPU is configured to perform an additional merge operation using the texel data, according to some aspects.

FIG. 2 illustrates an exemplary aspect of the GPU 104 of FIG. 1 that is configured to perform a merge operation (e.g., a sum operation or an XOR operation, as non-limiting examples) after reading texel data. As seen in FIG. 2, the processor circuit 106 of the GPU 104 executes the load instruction 114, which causes the GPU 104 to perform a series of operations. The GPU 104 performs the same operations for determining the first coordinate 116 and the second coordinate 118 from corresponding GPRs 108(0) and 108(1) of the plurality of GPRs 108(0)-108(G) as described above with respect to FIG. 1 and indicated by arrows 200 and 202, and for determining the first offset 124 and the second offset 126 from the GPR 108(2), as indicated by arrow 204. The GPU 104 then performs a texel access operation on the texel 112(1) and the texel 112(1) of the texture 110, as indicated by arrow 206, where the location of the texel 112(T) is represented by the first sum 132 of the first coordinate 116 and the first offset 124, and the second sum 134 of the second coordinate 118 and the second offset 126.

In performing the texel access operation (i.e., a load operation with merge, in the example of FIG. 2), the GPU 104 reads the texel data 136 corresponding to the texel 112(0) from the location of the texel 112(0), as indicated by arrow 208. The GPU 104 also reads the texel data 146 corresponding to the texel 112(1) from the location of the texel 112(1), as indicated by arrow 210. The GPU 104 then performs a merge operation 212 using the texel data 136 corresponding to the texel 112(0) and the texel data 146 corresponding to the texel 112(1), and then stores merged texel data (captioned as "MRG DATA" in FIG. 2) 214(0)-214(3) in a corresponding plurality of GPRs 108(3)-108(6) as indicated by arrows 216, 218, 220, and 222.

Figure 3:
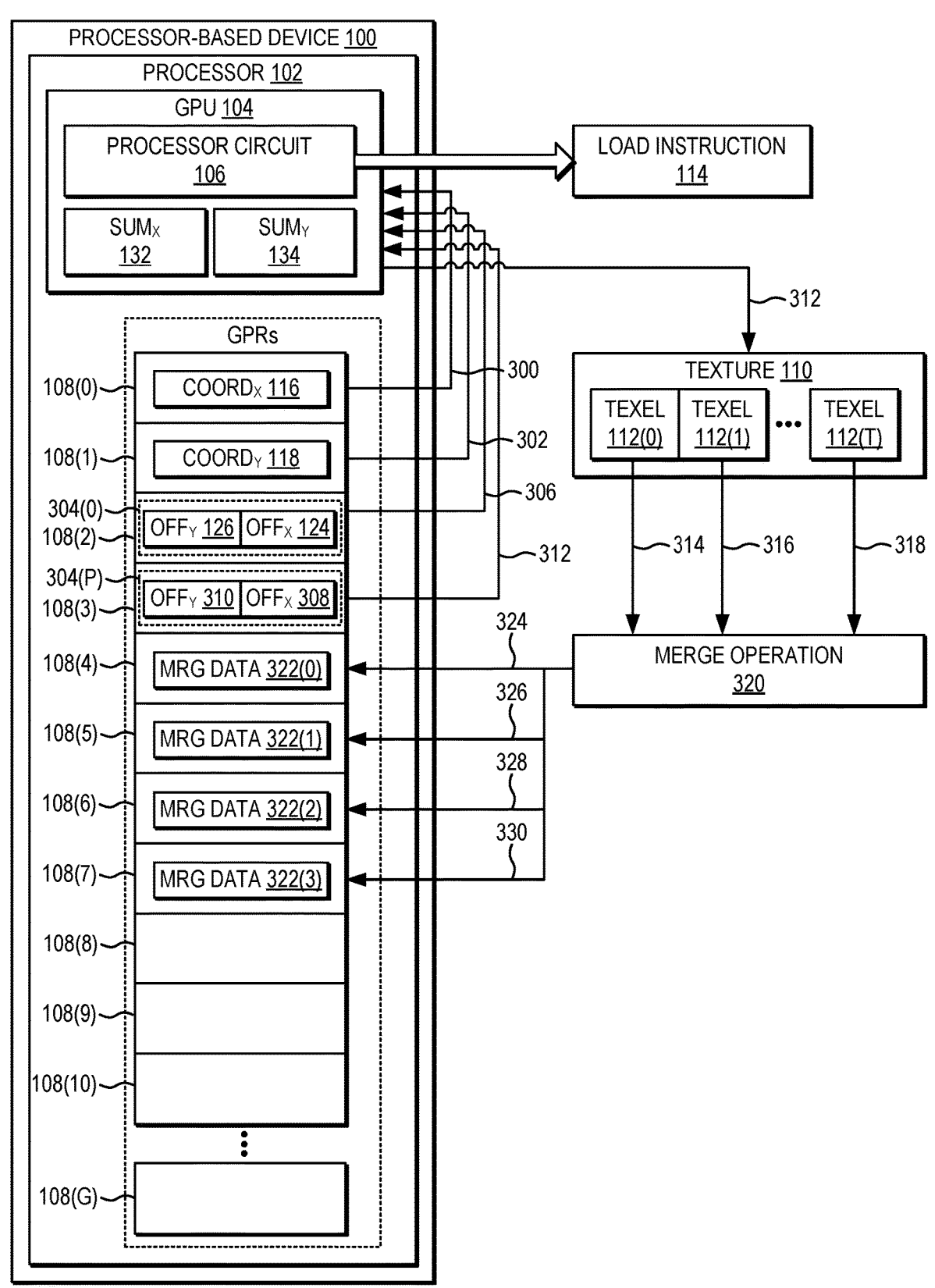
FIG. 3 is a block diagram of the exemplary processor-based system of FIG. 1 wherein the GPU is configured to employ multiple offset pairs to enable texel access operations on more than two (2) texels responsive to executing the single load instruction, according to some aspects.

FIG. 3 illustrates an exemplary aspect of the GPU 104 of FIG. 1 in which the GPU 104 is configured to employ multiple offset pairs to enable texel access operations on more than two (2) texels responsive to executing the load instruction 114. As shown in FIG. 3, the processor circuit 106 of the GPU 104 executes the load instruction 114, in response to which the GPU 104 performs a series of operations. The GPU 104 performs the same operations for determining the first coordinate 116 and the second coordinate 118 from corresponding GPRs 108(0) and 108(1) as described above with respect to FIG. 1 and indicated by arrows 300 and 302. The GPU 104 also determines a plurality of offset pairs 304(0)-304(P) (i.e., P=1 in this example) that each correspond to a texel subsequent to the texel 112(0) among the plurality of texels 112(0)-112(T). In this example, the GPU 104 reads an offset pair 304(0) comprising the first offset 124 and the second offset 126 from the GPR 108(2) as indicated by arrow 306, and also reads an offset pair 304(P) comprising a first offset (captioned as "OFF$_X$" in FIG. 3) 308 and a second offset (captioned as "OFF$_Y$" in FIG. 3) 310 from the GPR 108(3) as indicated by arrow 312. Each of the offset pairs 304(0) and 304(P) corresponds to a texel subsequent to the texel 112(0) of the texture 110. Thus, in this example, the offset pair 304(0) corresponds to the texel 112(1), while the offset pair 304(P) corresponds to the texel 112(T). It is to be understood that, while FIG. 3 shows only two (2) offset pairs 304(0)-304(P), some aspects may provide more than two (2) offset pairs 304(0)-304(P) (i.e., P>1).

The GPU 104 then performs the texel access operation (i.e., a load operation with merge, in the example of FIG. 3), as indicated by arrow 312. The GPU 104 in the aspect illustrated in FIG. 3 performs the texel access operation on the plurality of texels 112(0)-112(T), wherein a location of each texel 112(1), 112(T) subsequent to the texel 112(0) is represented by a sum of the first coordinate 116 and a first offset of the offset pair 304(0), 304(P) corresponding to the texel 112(1), 112(T) and a sum of the second coordinate 118 and a second offset of the offset pair 304(0), 304(P) corresponding to the texel 112(1), 112(T). In FIG. 3, the location of the texel 112(1) is represented by a sum of the first coordinate 116 and the offset 124 of the offset pair 304(0), and a sum of the second coordinate 118 and the offset 126 of the offset pair 304(0). Likewise, the location of the texel 112(T) is represented by a sum of the first coordinate 116 and a first offset 308 of the offset pair 304(P), and a sum of the second coordinate 118 and a second offset 310 of the offset pair 304(P).

The GPU 104 performs the texel access operation by reading texel data (not shown) corresponding to the texel 112(0) from the location of the texel 112(0), as indicated by arrow 314. The GPU 104 also reads texel data (not shown) corresponding to the texel 112(1) from the location of the texel 112(1), as indicated by arrow 316, and reads texel data (not shown) corresponding to the texel 112(T) from the location of the texel 112(T), as indicated by arrow 318. The GPU 104 in this example then performs a merge operation 320 using read texel data, and then stores merged texel data (captioned as "MRG DATA" in FIG. 3) 322(0)-322(3) in a corresponding plurality of GPRs 108(4)-108(7) as indicated by arrows 324, 326, 328, and 330. It is to be understood that the merge operation is shown in FIG. 3 only for the sake of illustration, and that some aspects may provide that the texel data read for the texels 112(0), 112(1), and 112(T) may be stored in the GPRs 108(0)-108(G) without a merge operation being performed.

Figure 4:
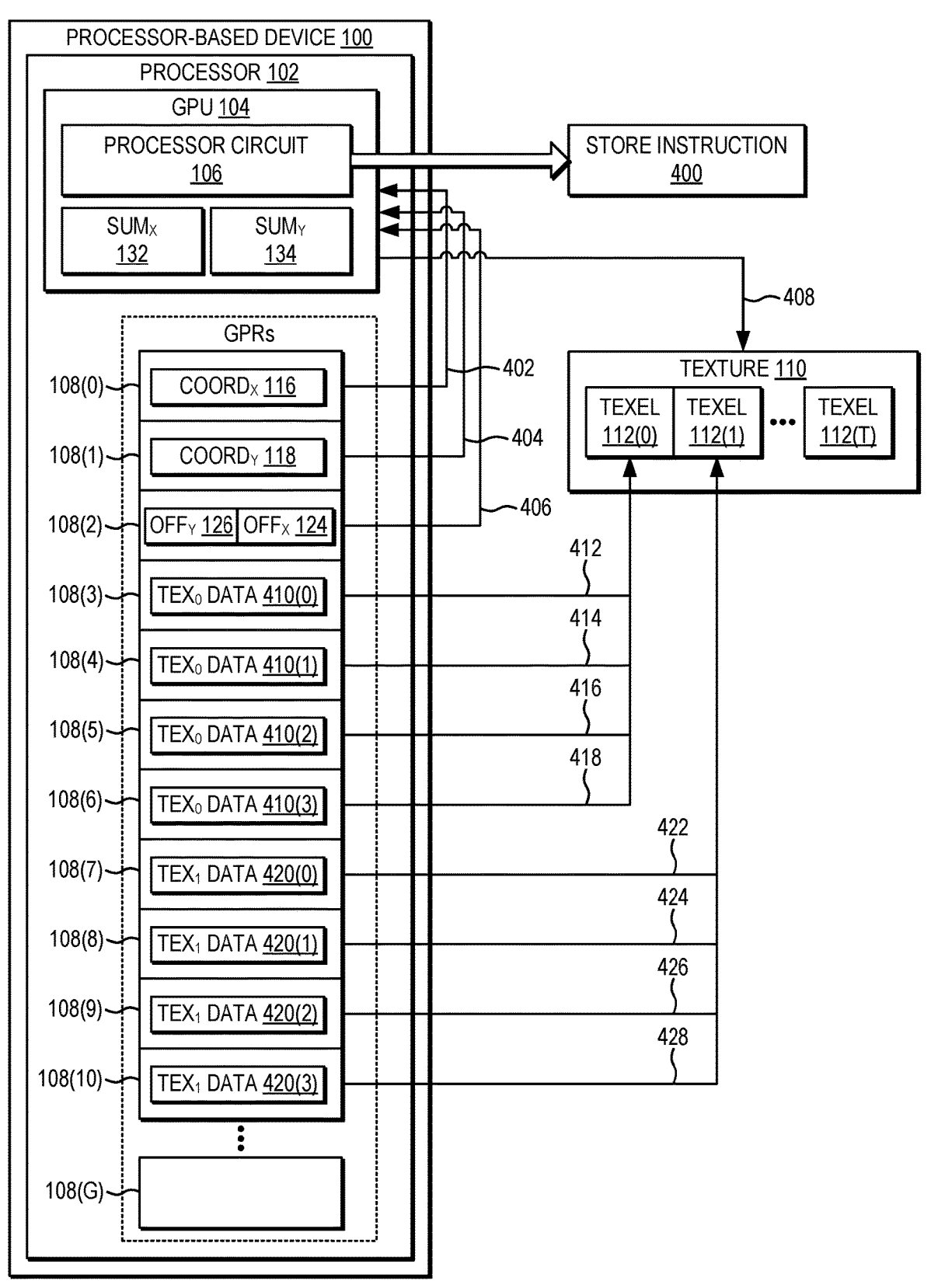
FIG. 4 is a block diagram of the exemplary processor-based system of FIG. 1 wherein the GPU is configured to perform texel access operations on multiple texels responsive to executing a single store instruction, according to some aspects.

FIG. 4 illustrates an exemplary aspect of the GPU 104 of FIG. 1 in which the single instruction executed by the GPU 104 is a store instruction 400 provided by the ISA of the GPU 104. In this example, the processor circuit 106 of the GPU 104 executes the store instruction 400, which causes the GPU 104 to perform a series of operations. The GPU 104 performs the same operations for determining the first coordinate 116 and the second coordinate 118 from corresponding GPRs 108(0) and 108(1) as described above with respect to FIG. 1 and indicated by arrows 402 and 404, and for determining the first offset 124 and the second offset 126 from the GPR 108(2), as indicated by arrow 406. The GPU 104 then performs a texel access operation on the texel 112(0) and the texel 112(1) of the texture 110, as indicated by arrow 408, where the location of the texel 112(1) is represented by the first sum 132 of the first coordinate 116 and the first offset 124, and the second sum 134 of the second coordinate 118 and the second offset 126.

In performing the texel access operation (i.e., a store operation, in the example of FIG. 4), the GPU 104 reads texel data (captioned as "TEX₀ DATA" in FIG. 4) 410(0)-410(3) corresponding to the texel 112(0) from a corresponding plurality of GPRs 108(3)-108(6) and stores the texel data 410(0)-410(3) corresponding to the texel 112(0) at the location of the texel 112(0), as indicated by arrows 412, 414, 416, and 418. The GPU 104 also reads texel data (captioned as "TEX₁ DATA" in FIG. 4) 420(0)-420(3) corresponding to the texel 112(1) from a corresponding plurality of GPRs 108(7)-108(10) and stores the texel data 420(0)-17(3) corresponding to the texel 112(1) at the location of the texel 112(1), as indicated by arrows 422, 424, 426, and 428.

To illustrate exemplary operations performed by the GPU 104 of FIG. 1 for performing texel access operations on multiple texels responsive to executing a single instruction according to some aspects, FIGS. 5A-5D provide a flowchart illustrating exemplary operations 500. For the sake of clarity, elements of FIGS. 1-4 are referenced in describing FIGS. 5A-5D. It is to be understood that, in some aspects, some of the exemplary operations 500 may be performed in an order other than that illustrated herein, and/or may be omitted.

Figure 5A:
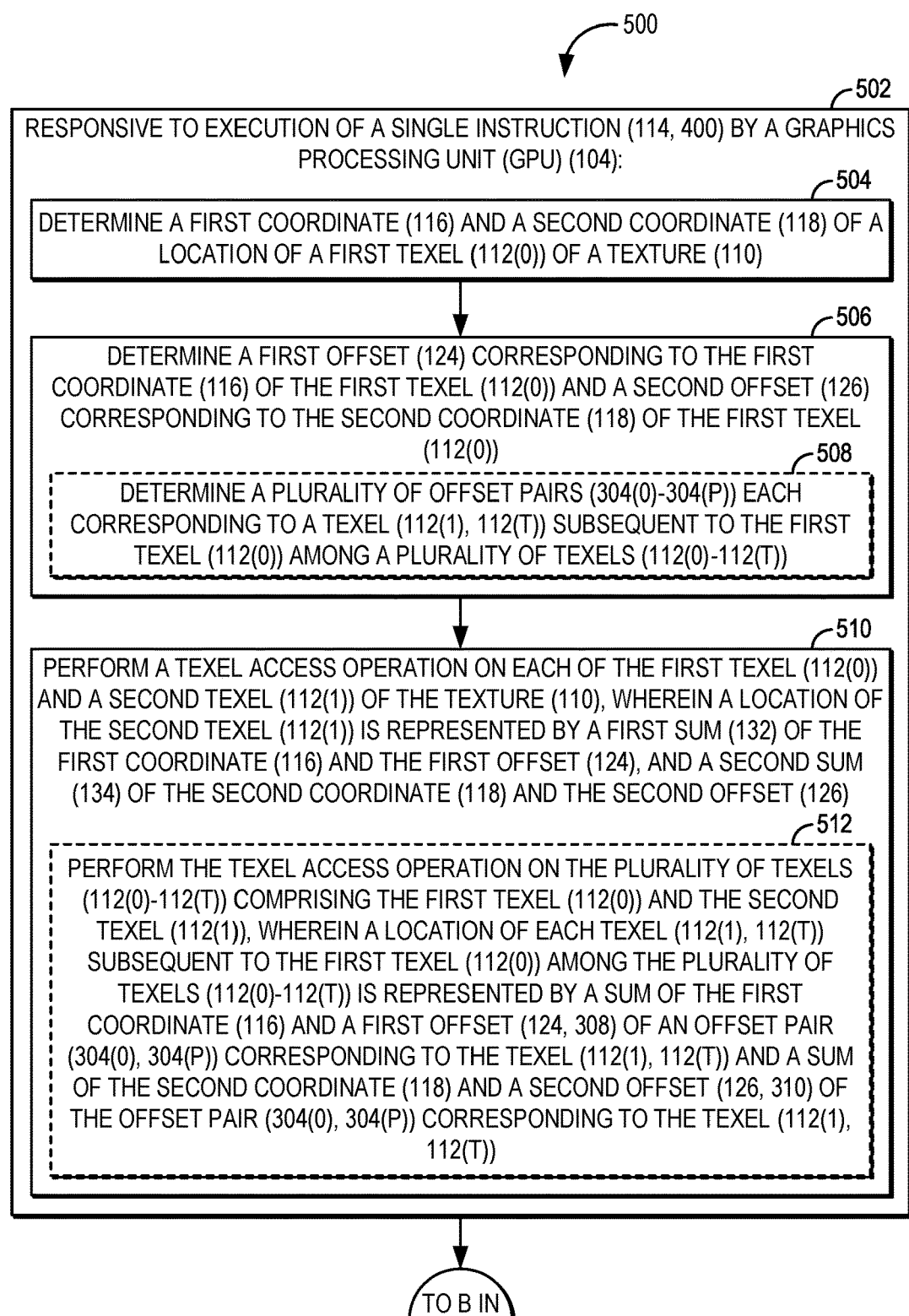
FIGS. 5A-5D provide a flowchart illustrating exemplary operations performed by the GPU of FIG. 1 for performing texel access operations on multiple texels responsive to executing a single instruction, according to some aspects.

The exemplary operations 500 begin in FIG. 5A with a GPU, such as the GPU 104 of FIGS. 1-4, performing a series of operations in response to execution of a single instruction (e.g., the load instruction 114 of FIGS. 1-3 or the store instruction 400 of FIG. 4) (block 502). The GPU 104 determines a first coordinate and a second coordinate (such as the first coordinate 116 and the second coordinate 118, respectively, of FIGS. 1-4) of a location of a first texel (e.g., the texel 112(0) of FIGS. 1-4) of a texture (e.g., the texture 110 of FIGS. 1-4) (block 504). The GPU 104 also determines a first offset (such as the first offset 124 of FIGS. 1-4) corresponding to the first coordinate 116 of the first texel 112(0) and a second offset (such as the second offset 126 of FIGS. 1-4) corresponding to the second coordinate 118 of the first texel 112(0) (block 506). In some aspects, the operations of block 506 for determining the first offset 124 and the second offset 126 may comprise the GPU 104 determining a plurality of offset pairs (e.g., the offset pairs 304(0)-304(P) of FIG. 3) each corresponding to a texel (such as the texel 112(1), 112(T)) subsequent to the first texel 112(0) among a plurality of texels (such as the texels 112(0)-112(T) of FIGS. 1-4) (block 508).

The GPU 104 then performs a texel access operation on each of the first texel 112(0) and a second texel (e.g., the texel 112(1) of FIGS. 1-4) of the texture 110, wherein a location of the second texel 112(1) is represented by a first sum (such as the first sum 132 of FIGS. 1-4) of the first coordinate 116 and the first offset 124, and a second sum (e.g., the second sum 134 of FIGS. 1-4) of the second coordinate 118 and the second offset 126 (block 510). In aspects in which the single instruction 114, 400 comprises the load instruction 114 of FIG. 3, the operations of block 510 for performing the texel access operation may comprise the GPU 104 performing the texel access operation on the plurality of texels 112(0)-112(T) comprising the first texel 112(0) and the second texel 112(1), wherein a location of each texel (e.g., the texel 112(1), 112(T) of FIGS. 1-4) subsequent to the first texel 112(0) among the plurality of texels 112(0)-112(T) is represented by a sum of the first coordinate 116 and a first offset (e.g., the first offset 124, 308 of FIG. 3) of an offset pair (e.g., the offset pair 304(0), 304(P) of FIG. 3) corresponding to the texel 112(1), 112(T) and a sum of the second coordinate 118 and a second offset (e.g., the second offset 126, 310 of FIG. 3) of the offset pair 304(0), 304(P) corresponding to the texel 112(1), 112(T) (block 512). The exemplary operations 500 according to some aspects may continue at block 514 of FIG. 5B.

Figure 5B:
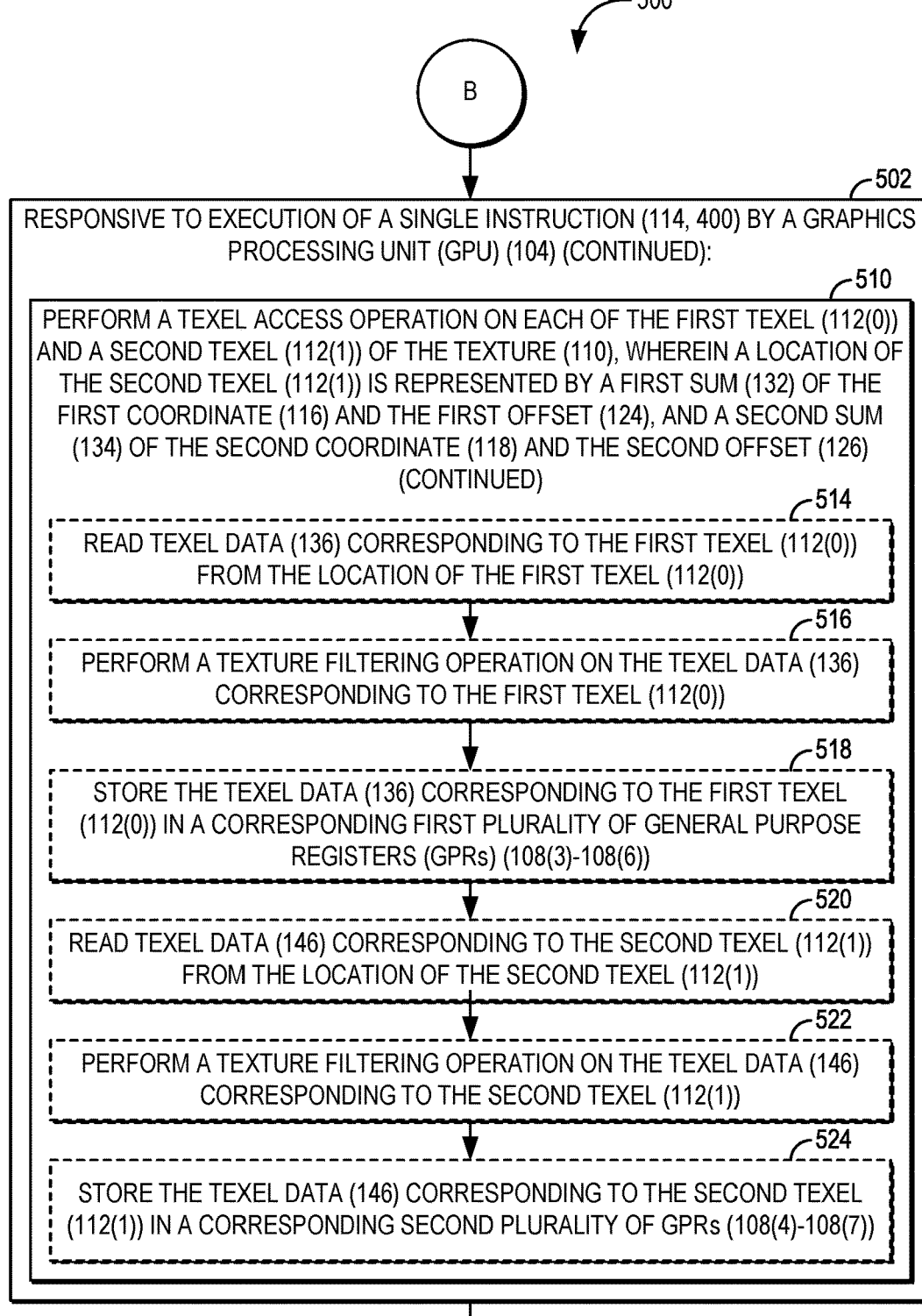

Turning now to FIG. 5B, the operations of the GPU 104 performed in response to execution of the single instruction 114, 400 continue (block 502). In some aspects according to FIG. 1, the operations of block 510 for performing the texel access operation may comprise the GPU 104 reading texel data (e.g., the texel data 136 of FIG. 1) corresponding to the first texel 112(0) from the location of the first texel 112(0) (block 514). Some such aspects may provide that the GPU 104 performs a texture filtering operation on the texel data 136 corresponding to the first texel 112(0) (block 516). The GPU 104 then stores the texel data 136 corresponding to the first texel 112(0) in a corresponding first plurality of GPRs (such as the GPRs 108(3)-108(6)) (block 518). The GPU 104 also reads texel data (e.g., the texel data 146 of FIG. 1) corresponding to the second texel 112(1) from the location of the second texel 112(1) (block 520). The GPU 104 in some such aspects may perform a texture filtering operation on the texel data 146 corresponding to the second texel 112(1) (block 522). The GPU 104 stores the texel data 146(0)-146(3) corresponding to the second texel 112(T) in a corresponding second plurality of GPRs (such as the GPRs 108(7)-108(10) of FIG. 1) (block 524). The exemplary operations in some aspects may continue at block 526 of FIG. 5C.

Figure 5C:
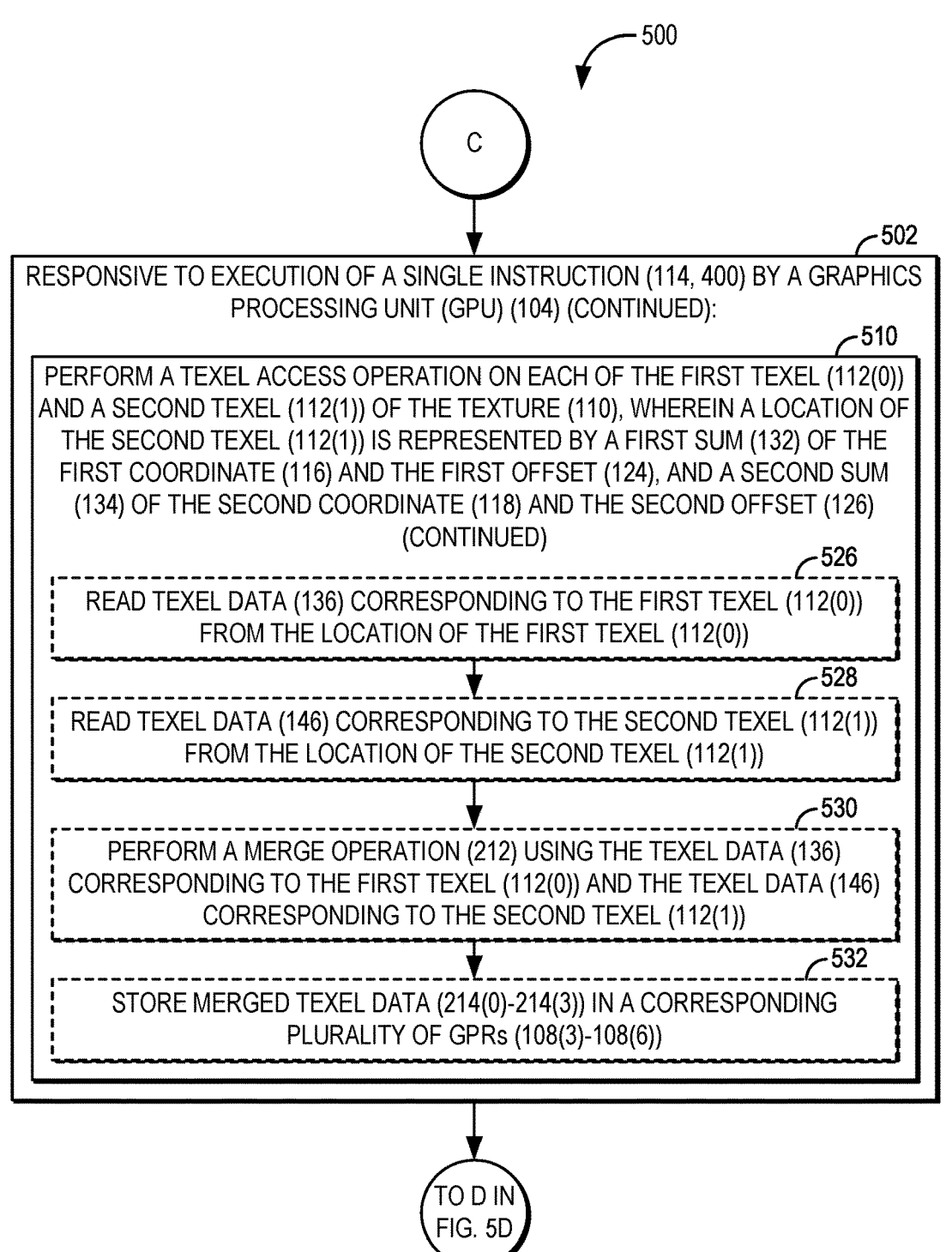

Referring now to FIG. 5C, the operations of the GPU 104 performed in response to execution of the single instruction 114, 400 continue (block 502). In aspects according to FIG. 2, the operations of block 510 for performing the texel access operation may comprise the GPU 104 reading the texel data 136 corresponding to the first texel 112(0) from the location of the first texel 112(0) (block 526). The GPU 104 also reads the texel data 146 corresponding to the second texel 112(1) from the location of the second texel 112(1) (block 528). The GPU 104 performs a merge operation (e.g., the merge operation 212 of FIG. 2) using the texel data 136 corresponding to the first texel 112(0) and the texel data 146 corresponding to the second texel 112(1) (block 530). The GPU 104 then stores merged texel data (e.g., the merged texel data 214(0)-214(3) of FIG. 2) in a corresponding plurality of GPRs (e.g., the GPRs 108(3)-108(6) of FIG. 2) (block 532). The exemplary operations according to some aspects may continue at block 534 of FIG. 5D.

Figure 5D:
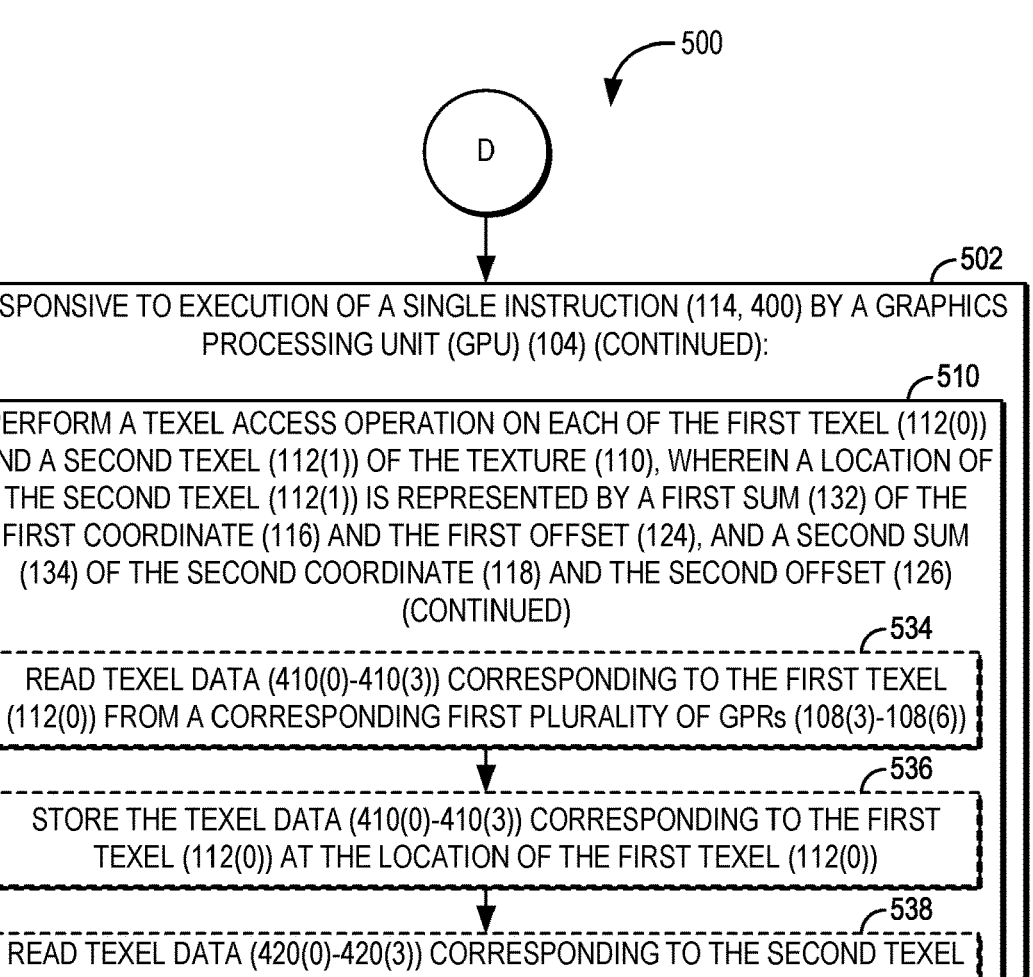

With reference now to FIG. 5D, the operations of the GPU 104 performed in response to execution of the single instruction 114, 400 continue (block 502). In aspects according to FIG. 4, the operations of block 510 for performing the texel access operation may comprise the GPU 104 reading texel data (e.g., the texel data 410(0)-410(3) of FIG. 4) corresponding to the first texel 112(0) from a corresponding first plurality of GPRs (such as the GPRs 108(3)-108(6) of FIG. 4) (block 534). The GPU 104 then stores the texel data 410(0)-410(3) corresponding to the first texel 112(0) at the location of the first texel 112(0) (block 536). The GPU 104 also reads texel data (such as the texel data 420(0)-420(3) of FIG. 4) corresponding to the second texel 112(1) from a corresponding second plurality of GPRs (e.g., the GPRs 108(7)-108(10) of FIG. 4) (block 538). The GPU 104 stores the texel data 420(0)-420(3) corresponding to the second texel 112(1) at the location of the second texel 112(1) (block 540).

The GPU according to aspects disclosed herein and discussed with reference to FIGS. 1-4 may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, laptop computer, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, an avionics system, a drone, and a multicopter.

Figure 6:
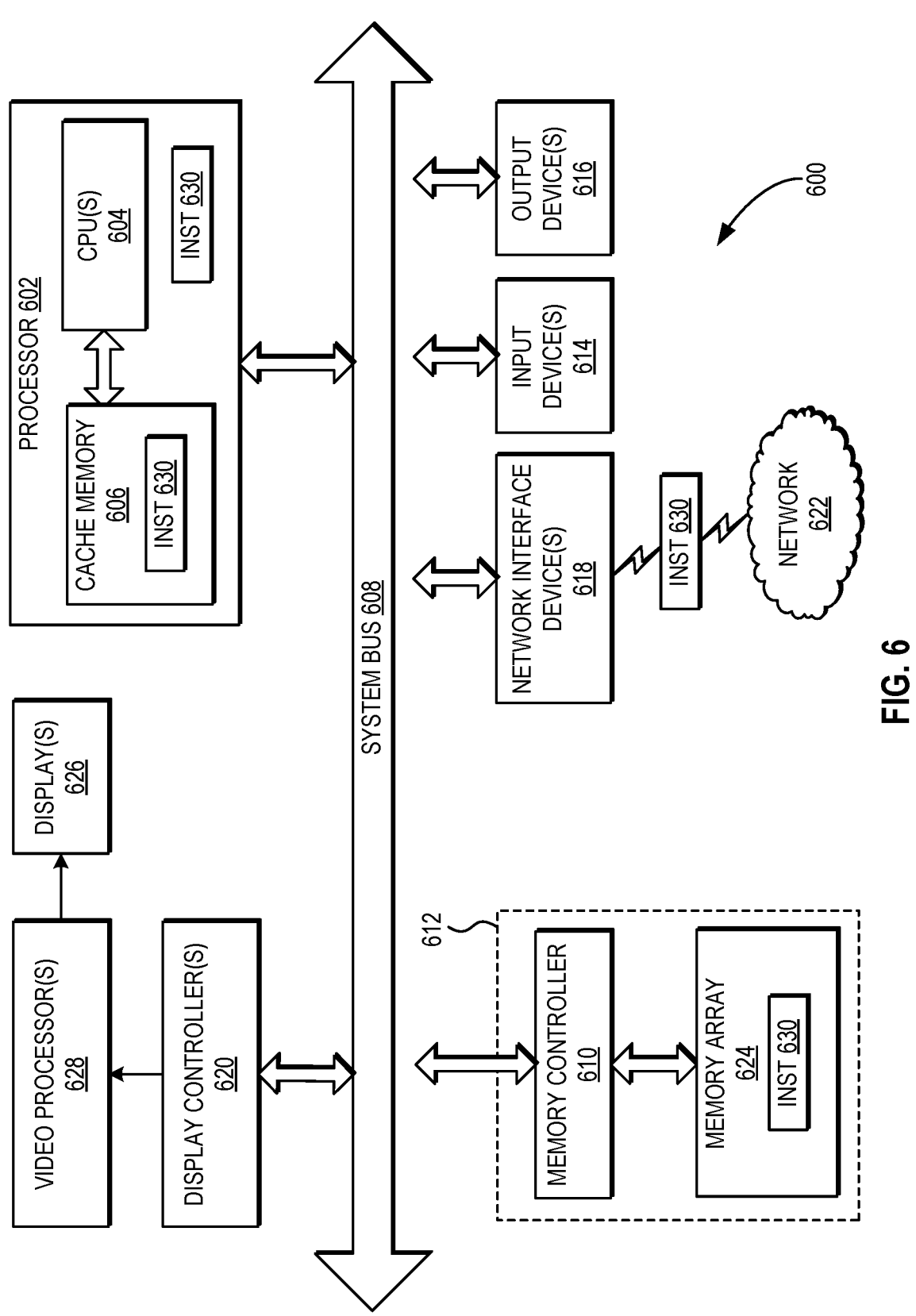
FIG. 6 is a block diagram of an exemplary processor-based device that can include the processor-based device of FIG. 1.

In this regard, FIG. 6 illustrates an example of a processor-based device 600 as illustrated and described with respect to FIGS. 1-4. In this example, the processor-based device 600, which corresponds in functionality to the processor-based device 100 of FIGS. 1-4, includes a processor 602 which comprises one or more central processing units (CPUs) 604 coupled to a cache memory 606. The processor 602 is also coupled to a system bus 608 and can intercouple devices included in the processor-based device 600. As is well known, the processor 602 communicates with these other devices by exchanging address, control, and data information over the system bus 608. For example, the processor 602 can communicate bus transaction requests to a memory controller 610. Although not illustrated in FIG. 6, multiple system buses 608 could be provided, wherein each system bus 608 constitutes a different fabric.

Other devices may be connected to the system bus 608. As illustrated in FIG. 6, these devices can include a memory system 612, one or more input devices 614, one or more output devices 616, one or more network interface devices 618, and one or more display controllers 620, as examples. The input device(s) 614 can include any type of input device, including, but not limited to, input keys, switches, voice processors, etc. The output device(s) 616 can include any type of output device, including, but not limited to, audio, video, other visual indicators, etc. The network interface device(s) 618 can be any device configured to allow exchange of data to and from a network 622. The network 622 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 618 can be configured to support any type of communications protocol desired. The memory system 612 can include the memory controller 610 coupled to one or more memory arrays 624. The display controller(s) may comprise, e.g., the GPU 104 of FIGS. 1-4.

The processor 602 may also be configured to access the display controller(s) 620 over the system bus 608 to control information sent to one or more displays 626. The display controller(s) 620 sends information to the display(s) 626 to be displayed via one or more video processors 628, which process the information to be displayed into a format suitable for the display(s) 626. The display(s) 626 can include any type of display, including, but not limited to, a cathode ray tube (CRT), a liquid crystal display (LCD), a plasma display, a light emitting diode (LED) display, etc.

The processor-based device 600 in FIG. 6 may include a set of instructions (captioned as "INST" in FIG. 6) 630 that may be executed by the processor 602 for any application desired according to the instructions. The instructions 630 may be stored in the memory system 612, the processor 602, and/or the cache memory 606, each of which may comprise an example of a non-transitory computer-readable medium. The instructions 630 may also reside, completely or at least partially, within the memory system 612 and/or within the processor 602 during their execution. The instructions 630 may further be transmitted or received over the network 622, such that the network 622 may comprise an example of a computer-readable medium.

While the computer-readable medium is described in an exemplary embodiment herein to be a single medium, the term "computer-readable medium" should be taken to include a single medium or multiple media (e.g., a centralized or distributed database, and/or associated caches and servers) that store the one or more sets of instructions 630. The term "computer-readable medium" shall also be taken to include any medium that is capable of storing, encoding, or carrying a set of instructions for execution by a processing device and that cause the processing device to perform any one or more of the methodologies of the embodiments disclosed herein. The term "computer-readable medium" shall accordingly be taken to include, but not be limited to, solid-state memories, optical medium, and magnetic medium.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered clauses:

1. A graphics processing unit (GPU), configured to, responsive to execution of a single instruction:
   determine a first coordinate and a second coordinate of a location of a first texel of a texture;
   determine a first offset corresponding to the first coordinate of the first texel and a second offset corresponding to the second coordinate of the first texel; and
   perform a texel access operation on each of the first texel and a second texel of the texture, wherein a location of the second texel is represented by a first sum of the first coordinate and the first offset, and a second sum of the second coordinate and the second offset.

2. The GPU of clause 1, wherein:
   the first coordinate comprises one of an X coordinate and a Y coordinate of the location of the first texel; and
   the second coordinate comprises another of the X coordinate and the Y coordinate of the first texel.

3. The GPU of any one of clauses 1-2, wherein:
   a plurality of offset pairs comprises the first offset and the second offset as an offset pair corresponding to the second texel;
   the GPU is configured to determine the first offset corresponding to the first coordinate of the first texel and the second offset corresponding to the second coordinate of the first texel by being configured to determine the plurality of offset pairs each corresponding to a texel subsequent to the first texel among a plurality of texels; and
   the GPU is configured to perform the texel access operation on each of the first texel and the second texel of the texture by being configured to perform the texel access operation on the plurality of texels comprising the first texel and the second texel, wherein a location of each texel subsequent to the first texel among the plurality of texels is represented by a sum of the first coordinate and a first offset of an offset pair corresponding to the texel and a sum of the second coordinate and a second offset of the offset pair corresponding to the texel.

4. The GPU of clause any one of clauses 1-3, wherein:
   the texel access operation comprises a load operation; and the GPU is configured to perform the texel access operation on each of the first texel and the second texel of the texture by being configured to:

read texel data corresponding to the first texel from the location of the first texel; and read texel data corresponding to the second texel from the location of the second texel.

5. The GPU of clause 4, wherein the GPU is further configured to perform the texel access operation on each of the first texel and the second texel of the texture by being configured to:

perform a first texture filtering operation on the texel data corresponding to the first texel; and perform a second texture filtering operation on the texel data corresponding to the second texel.

6. The GPU of any one of clauses 4-5, wherein the GPU is further configured to perform the texel access operation on each of the first texel and the second texel of the texture by being configured to:

store the texel data corresponding to the first texel in a corresponding first plurality of general purpose registers (GPRs); and store the texel data corresponding to the second texel in a corresponding second plurality of GPRs.

7. The GPU of any one of clauses 4-5, wherein the GPU is further configured to perform the texel access operation on each of the first texel and the second texel of the texture by being configured to:

perform a merge operation using the texel data corresponding to the first texel and the texel data corresponding to the second texel; and store merged texel data in a corresponding plurality of general purpose registers (GPRs).

8. The GPU of clause 7, wherein the merge operation comprises one of a sum operation and an exclusive-OR (XOR) operation.

9. The GPU of any one of clauses 1-3, wherein:

the texel access operation comprises a store operation; and the GPU is configured to perform the texel access operation on each of the first texel and the second texel of the texture by being configured to:

read texel data corresponding to the first texel from a corresponding first plurality of general purpose registers (GPRs);

store the texel data corresponding to the first texel at the location of the first texel;

read texel data corresponding to the second texel from a corresponding second plurality of GPRs; and store the texel data corresponding to the second texel at the location of the second texel.

10. The GPU of any one of clauses 1-9, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. A graphics processing unit (GPU), comprising:

means for, responsive to execution of a single instruction, determining a first coordinate and a second coordinate of a location of a first texel of a texture;

means for determining a first offset corresponding to the first coordinate of the first texel and a second offset corresponding to the second coordinate of the first texel; and means for performing a texel access operation on each of the first texel and a second texel of the texture, wherein a location of the second texel is represented by a first sum of the first coordinate and the first offset, and a second sum of the second coordinate and the second offset.

12. A method for performing texel access operations on multiple texels responsive to executing a single instruction, comprising:

determining, in response to execution of a single instruction by a graphics processing unit (GPU), a first coordinate and a second coordinate of a location of a first texel of a texture;

determining a first offset corresponding to the first coordinate of the first texel and a second offset corresponding to the second coordinate of the first texel; and performing a texel access operation on each of the first texel and a second texel of the texture, wherein a location of the second texel is represented by a first sum of the first coordinate and the first offset, and a second sum of the second coordinate and the second offset.

13. The method of clause 12, wherein:

the first coordinate comprises one of an X coordinate and a Y coordinate of the location of the first texel; and the second coordinate comprises another of the X coordinate and the Y coordinate of the first texel.

14. The method of any one of clauses 12-13, wherein:

a plurality of offset pairs comprises the first offset and the second offset as an offset pair corresponding to the second texel;

determining the first offset corresponding to the first coordinate of the first texel and the second offset corresponding to the second coordinate of the first texel comprises determining the plurality of offset pairs each corresponding to a texel subsequent to the first texel among a plurality of texels; and performing the texel access operation on each of the first texel and the second texel of the texture comprises performing the texel access operation on the plurality of texels comprising the first texel and the second texel, wherein a location of each texel subsequent to the first texel among the plurality of texels is represented by a sum of the first coordinate and a first offset of an offset pair corresponding to the texel and a sum of the second coordinate and a second offset of the offset pair corresponding to the texel.

15. The method of any one of clauses 12-14, wherein:

the texel access operation comprises a load operation; and performing the texel access operation on each of the first texel and the second texel of the texture comprises:

reading texel data corresponding to the first texel from the location of the first texel; and reading texel data corresponding to the second texel from the location of the second texel.

16. The method of clause 15, wherein performing the texel access operation on each of the first texel and the second texel of the texture further comprises:

perform a first texture filtering operation on the texel data corresponding to the first texel; and perform a second texture filtering operation on the texel data corresponding to the second texel.

17. The method of any one of clauses 15-16, wherein performing the texel access operation on each of the first texel and the second texel of the texture further comprises:

storing the texel data corresponding to the first texel in a corresponding first plurality of general purpose registers (GPRs); and storing the texel data corresponding to the second texel in a corresponding second plurality of GPRs.

18. The method of any one of clauses 15-16, wherein performing the texel access operation on each of the first texel and the second texel of the texture further comprises:

performing a merge operation using the texel data corresponding to the first texel and the texel data corresponding to the second texel; and storing merged texel data in a corresponding plurality of general purpose registers (GPRs).

19. The method of clause 18, wherein the merge operation comprises one of a sum operation and an exclusive-OR (XOR) operation.

20. The method of any one of clauses 12-14, wherein:

the texel access operation comprises a store operation; and performing the texel access operation on each of the first texel and the second texel of the texture comprises:

reading texel data corresponding to the first texel from a corresponding first plurality of general purpose registers (GPRs);

storing the texel data corresponding to the first texel at the location of the first texel;

reading texel data corresponding to the second texel from a corresponding second plurality of GPRs; and storing the texel data corresponding to the second texel at the location of the second texel.

21. A non-transitory computer-readable medium having stored thereon computer-executable instructions which, when executed by a graphics processing unit (GPU), cause the GPU to, responsive to execution of a single instruction:

determine a first coordinate and a second coordinate of a location of a first texel of a texture;

determine a first offset corresponding to the first coordinate of the first texel and a second offset corresponding to the second coordinate of the first texel; and perform a texel access operation on each of the first texel and a second texel of the texture, wherein a location of the second texel is represented by a first sum of the first coordinate and the first offset, and a second sum of the second coordinate and the second offset.

22. The non-transitory computer-readable medium of clause 21, wherein:

the first coordinate comprises one of an X coordinate and a Y coordinate of the location of the first texel; and the second coordinate comprises another of the X coordinate and the Y coordinate of the first texel.

23. The non-transitory computer-readable medium of any one of clauses 21-22, wherein:

a plurality of offset pairs comprises the first offset and the second offset as an offset pair corresponding to the second texel;

the computer-executable instructions cause the GPU to determine the first offset corresponding to the first coordinate of the first texel and the second offset corresponding to the second coordinate of the first texel by causing the GPU to determine the plurality of offset pairs each corresponding to a texel subsequent to the first texel among a plurality of texels; and the computer-executable instructions cause the GPU to perform the texel access operation on each of the first texel and the second texel of the texture by causing the GPU to perform the texel access operation on the plurality of texels comprising the first texel and the second texel, wherein a location of each texel subsequent to the first texel among the plurality of texels is represented by a sum of the first coordinate and a first offset of an offset pair corresponding to the texel and a sum of the second coordinate and a second offset of the offset pair corresponding to the texel.

24. The non-transitory computer-readable medium of any one of clauses 21-23, wherein:

the texel access operation comprises a load operation; and the computer-executable instructions cause the GPU to perform the texel access operation on each of the first texel and the second texel of the texture by causing the GPU to:

read texel data corresponding to the first texel from the location of the first texel; and read texel data corresponding to the second texel from the location of the second texel.

25. The non-transitory computer-readable medium of clause 24, wherein the computer-executable instructions further cause the GPU to perform the texel access operation on each of the first texel and the second texel of the texture by causing the GPU to:

perform a first texture filtering operation on the texel data corresponding to the first texel; and perform a second texture filtering operation on the texel data corresponding to the second texel.

26. The non-transitory computer-readable medium of any one of clauses 24-25, wherein the computer-executable instructions further cause the GPU to perform the texel access operation on each of the first texel and the second texel of the texture by causing the GPU to:

store the texel data corresponding to the first texel in a corresponding first plurality of general purpose registers (GPRs); and store the texel data corresponding to the second texel in a corresponding second plurality of GPRs.

27. The non-transitory computer-readable medium of any one of clauses 24-25, wherein the computer-executable instructions further cause the GPU to perform the texel access operation on each of the first texel and the second texel of the texture by causing the GPU to:

perform a merge operation using the texel data corresponding to the first texel and the texel data corresponding to the second texel; and store merged texel data in a corresponding plurality of general purpose registers (GPRs).

28. The non-transitory computer-readable medium of clause 27, wherein the merge operation comprises one of a sum operation and an exclusive-OR (XOR) operation.

29. The non-transitory computer-readable medium of any one of clauses 21-23, wherein:

the texel access operation comprises a store operation; and the computer-executable instructions cause the GPU to perform the texel access operation on each of the first texel and the second texel of the texture by causing the GPU to:

read texel data corresponding to the first texel from a corresponding first plurality of general purpose registers (GPRs);

store the texel data corresponding to the first texel at the location of the first texel;

read texel data corresponding to the second texel from a corresponding second plurality of GPRs; and store the texel data corresponding to the second texel at the location of the second texel.

What is claimed is:

1. A graphics processing unit (GPU), configured to, responsive to execution of a single instruction:

determine a first coordinate and a second coordinate of a location of a first texel of a texture by being configured to:

receive the first coordinate from a first register indicated by the single instruction; and receive the second coordinate from a second register indicated by the single instruction;

determine a first offset corresponding to the first coordinate of the first texel and a second offset corresponding to the second coordinate of the first texel by being configured to receive the first offset and the second offset from a third register indicated by the single instruction; and perform a texel access operation on each of the first texel and a second texel of the texture, wherein a location of the second texel is represented by a first sum of the first coordinate and the first offset, and a second sum of the second coordinate and the second offset.

2. The GPU of claim 1, wherein:

the first coordinate comprises one of an X coordinate and a Y coordinate of the location of the first texel; and the second coordinate comprises another of the X coordinate and the Y coordinate of the first texel.

3. The GPU of claim 1, wherein:

a plurality of offset pairs comprises the first offset and the second offset as an offset pair corresponding to the second texel;

the GPU is configured to determine the first offset corresponding to the first coordinate of the first texel and the second offset corresponding to the second coordinate of the first texel by being configured to determine the plurality of offset pairs each corresponding to a texel subsequent to the first texel among a plurality of texels; and the GPU is configured to perform the texel access operation on each of the first texel and the second texel of the texture by being configured to perform the texel access operation on the plurality of texels comprising the first texel and the second texel, wherein a location of each texel subsequent to the first texel among the plurality of texels is represented by a sum of the first coordinate and a first offset of an offset pair corresponding to the texel and a sum of the second coordinate and a second offset of the offset pair corresponding to the texel.

4. The GPU of claim 1, wherein:

the texel access operation comprises a load operation; and the GPU is configured to perform the texel access operation on each of the first texel and the second texel of the texture by being configured to:

read texel data corresponding to the first texel from the location of the first texel; and read texel data corresponding to the second texel from the location of the second texel.

5. The GPU of claim 4, wherein the GPU is further configured to perform the texel access operation on each of the first texel and the second texel of the texture by being configured to:

perform a first texture filtering operation on the texel data corresponding to the first texel; and perform a second texture filtering operation on the texel data corresponding to the second texel.

6. The GPU of claim 4, wherein the GPU is further configured to perform the texel access operation on each of the first texel and the second texel of the texture by being configured to:

store the texel data corresponding to the first texel in a corresponding first plurality of general purpose registers (GPRs); and store the texel data corresponding to the second texel in a corresponding second plurality of GPRs.

7. The GPU of claim 4, wherein the GPU is further configured to perform the texel access operation on each of the first texel and the second texel of the texture by being configured to:

perform a merge operation using the texel data corresponding to the first texel and the texel data corresponding to the second texel; and store merged texel data in a corresponding plurality of general purpose registers (GPRs).

8. The GPU of claim 7, wherein the merge operation comprises one of a sum operation and an exclusive-OR (XOR) operation.

9. The GPU of claim 1, wherein:

the texel access operation comprises a store operation; and the GPU is configured to perform the texel access operation on each of the first texel and the second texel of the texture by being configured to:

read texel data corresponding to the first texel from a corresponding first plurality of general purpose registers (GPRs);

store the texel data corresponding to the first texel at the location of the first texel;

read texel data corresponding to the second texel from a corresponding second plurality of GPRs; and store the texel data corresponding to the second texel at the location of the second texel.

10. The GPU of claim 1, integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

11. A graphics processing unit (GPU), comprising:
means for, responsive to execution of a single instruction, determining a first coordinate and a second coordinate of a location of a first texel of a texture, wherein the means for determining the first coordinate and the second coordinate comprise:
    means for receiving the first coordinate from a first register indicated by the single instruction; and
    means for receiving the second coordinate from a second register indicated by the single instruction;
means for determining a first offset corresponding to the first coordinate of the first texel and a second offset corresponding to the second coordinate of the first texel, wherein the means for determining the first offset and the second offset comprise means for receiving the first offset and the second offset from a third register indicated by the single instruction; and
means for performing a texel access operation on each of the first texel and a second texel of the texture, wherein a location of the second texel is represented by a first sum of the first coordinate and the first offset, and a second sum of the second coordinate and the second offset.

12. A method for performing texel access operations on multiple texels responsive to executing a single instruction, comprising:
determining, in response to execution of a single instruction by a graphics processing unit (GPU), a first coordinate and a second coordinate of a location of a first texel of a texture by:
    receiving the first coordinate from a first register indicated by the single instruction; and
    receiving the second coordinate from a second register indicated by the single instruction;
determining a first offset corresponding to the first coordinate of the first texel and a second offset corresponding to the second coordinate of the first texel by receiving the first offset and the second offset from a third register indicated by the single instruction; and
performing a texel access operation on each of the first texel and a second texel of the texture, wherein a location of the second texel is represented by a first sum of the first coordinate and the first offset, and a second sum of the second coordinate and the second offset.

13. The method of claim 12, wherein:
the first coordinate comprises one of an X coordinate and a Y coordinate of the location of the first texel; and
the second coordinate comprises another of the X coordinate and the Y coordinate of the first texel.

14. The method of claim 12, wherein:
a plurality of offset pairs comprises the first offset and the second offset as an offset pair corresponding to the second texel;
determining the first offset corresponding to the first coordinate of the first texel and the second offset corresponding to the second coordinate of the first texel comprises determining the plurality of offset pairs each corresponding to a texel subsequent to the first texel among a plurality of texels; and performing the texel access operation on each of the first texel and the second texel of the texture comprises performing the texel access operation on the plurality of texels comprising the first texel and the second texel, wherein a location of each texel subsequent to the first texel among the plurality of texels is represented by a sum of the first coordinate and a first offset of an offset pair corresponding to the texel and a sum of the second coordinate and a second offset of the offset pair corresponding to the texel.

15. The method of claim 12, wherein:
the texel access operation comprises a load operation; and
performing the texel access operation on each of the first texel and the second texel of the texture comprises:
    reading texel data corresponding to the first texel from the location of the first texel; and
    reading texel data corresponding to the second texel from the location of the second texel.

16. The method of claim 15, wherein performing the texel access operation on each of the first texel and the second texel of the texture further comprises:
    perform a first texture filtering operation on the texel data corresponding to the first texel; and
    perform a second texture filtering operation on the texel data corresponding to the second texel.

17. The method of claim 15, wherein performing the texel access operation on each of the first texel and the second texel of the texture further comprises:
    storing the texel data corresponding to the first texel in a corresponding first plurality of general purpose registers (GPRs); and
    storing the texel data corresponding to the second texel in a corresponding second plurality of GPRs.

18. The method of claim 15, wherein performing the texel access operation on each of the first texel and the second texel of the texture further comprises:
    performing a merge operation using the texel data corresponding to the first texel and the texel data corresponding to the second texel; and
    storing merged texel data in a corresponding plurality of general purpose registers (GPRs).

19. The method of claim 18, wherein the merge operation comprises one of a sum operation and an exclusive-OR (XOR) operation.

20. The method of claim 12, wherein:
the texel access operation comprises a store operation; and
performing the texel access operation on each of the first texel and the second texel of the texture comprises:
    reading texel data corresponding to the first texel from a corresponding first plurality of general purpose registers (GPRs);
    storing the texel data corresponding to the first texel at the location of the first texel;
    reading texel data corresponding to the second texel from a corresponding second plurality of GPRs; and
    storing the texel data corresponding to the second texel at the location of the second texel.

21. A non-transitory computer-readable medium having stored thereon computer-executable instructions which, when executed by a graphics processing unit (GPU), cause the GPU to, responsive to execution of a single instruction:
    determine a first coordinate and a second coordinate of a location of a first texel of a texture by causing the GPU to:
        receive the first coordinate from a first register indicated by the single instruction; and receive the second coordinate from a second register indicated by the single instruction;

determine a first offset corresponding to the first coordinate of the first texel and a second offset corresponding to the second coordinate of the first texel by causing the GPU to receive the first offset and the second offset from a third register indicated by the single instruction; and perform a texel access operation on each of the first texel and a second texel of the texture, wherein a location of the second texel is represented by a first sum of the first coordinate and the first offset, and a second sum of the second coordinate and the second offset.

22. The non-transitory computer-readable medium of claim 21, wherein:

the first coordinate comprises one of an X coordinate and a Y coordinate of the location of the first texel; and the second coordinate comprises another of the X coordinate and the Y coordinate of the first texel.

23. The non-transitory computer-readable medium of claim 21, wherein:

a plurality of offset pairs comprises the first offset and the second offset as an offset pair corresponding to the second texel;

the computer-executable instructions cause the GPU to determine the first offset corresponding to the first coordinate of the first texel and the second offset corresponding to the second coordinate of the first texel by causing the GPU to determine the plurality of offset pairs each corresponding to a texel subsequent to the first texel among a plurality of texels; and the computer-executable instructions cause the GPU to perform the texel access operation on each of the first texel and the second texel of the texture by causing the GPU to perform the texel access operation on the plurality of texels comprising the first texel and the second texel, wherein a location of each texel subsequent to the first texel among the plurality of texels is represented by a sum of the first coordinate and a first offset of an offset pair corresponding to the texel and a sum of the second coordinate and a second offset of the offset pair corresponding to the texel.

24. The non-transitory computer-readable medium of claim 21, wherein:

the texel access operation comprises a load operation; and the computer-executable instructions cause the GPU to perform the texel access operation on each of the first texel and the second texel of the texture by causing the GPU to:

read texel data corresponding to the first texel from the location of the first texel; and

read texel data corresponding to the second texel from the location of the second texel.

25. The non-transitory computer-readable medium of claim 24, wherein the computer-executable instructions further cause the GPU to perform the texel access operation on each of the first texel and the second texel of the texture by causing the GPU to:

perform a first texture filtering operation on the texel data corresponding to the first texel; and perform a second texture filtering operation on the texel data corresponding to the second texel.

26. The non-transitory computer-readable medium of claim 24, wherein the computer-executable instructions further cause the GPU to perform the texel access operation on each of the first texel and the second texel of the texture by causing the GPU to:

store the texel data corresponding to the first texel in a corresponding first plurality of general purpose registers (GPRs); and store the texel data corresponding to the second texel in a corresponding second plurality of GPRs.

27. The non-transitory computer-readable medium of claim 24, wherein the computer-executable instructions further cause the GPU to perform the texel access operation on each of the first texel and the second texel of the texture by causing the GPU to:

perform a merge operation using the texel data corresponding to the first texel and the texel data corresponding to the second texel; and store merged texel data in a corresponding plurality of general purpose registers (GPRs).

28. The non-transitory computer-readable medium of claim 27, wherein the merge operation comprises one of a sum operation and an exclusive-OR (XOR) operation.

29. The non-transitory computer-readable medium of claim 21, wherein:

the texel access operation comprises a store operation; and the computer-executable instructions cause the GPU to perform the texel access operation on each of the first texel and the second texel of the texture by causing the GPU to:

read texel data corresponding to the first texel from a corresponding first plurality of general purpose registers (GPRs);

store the texel data corresponding to the first texel at the location of the first texel;

read texel data corresponding to the second texel from a corresponding second plurality of GPRs; and store the texel data corresponding to the second texel at the location of the second texel.

* * * * *